United States Patent [19]
Wakashima et al.

[11] Patent Number: 5,705,114
[45] Date of Patent: Jan. 6, 1998

[54] ELEMENTS HAVING HEAD PORTIONS WITH ARCUATE EXTERNAL SHAPES

[75] Inventors: Toshiharu Wakashima; Sakae Aimono, both of Toyama-ken, Japan

[73] Assignee: YKK Corporation, Tokyo, Japan

[21] Appl. No.: 505,658

[22] Filed: Jul. 21, 1995

[30] Foreign Application Priority Data

Aug. 2, 1994 [JP] Japan .................................. 6-181021

[51] Int. Cl.$^6$ .................................................... B29C 53/58
[52] U.S. Cl. .................. 264/281; 425/814; 425/DIG. 34
[58] Field of Search ............................ 425/DIG. 34, 814; 264/281, 287, 285

[56] References Cited

U.S. PATENT DOCUMENTS

| | | | |
|---|---|---|---|
| 2,974,372 | 3/1961 | Yoshida | 264/281 |
| 3,197,537 | 7/1965 | Hansen | 264/287 |
| 3,213,174 | 10/1965 | Galonska | 264/287 |
| 3,229,362 | 1/1966 | Yoshida | 264/281 |
| 3,445,560 | 5/1969 | Steingruebner | 264/281 |
| 3,666,853 | 5/1972 | Popovitsch | 264/281 |
| 3,672,805 | 6/1972 | Porepp | 264/281 X |
| 3,705,229 | 12/1972 | Heimberger | 264/281 |
| 3,730,817 | 5/1973 | Frohlich et al. | 156/580 |
| 3,836,413 | 9/1974 | Frohlich et al. | 156/73 |
| 4,333,903 | 6/1982 | Yoshida et al. | 264/165 |
| 4,406,849 | 9/1983 | Takahashi et al. | 425/DIG. 34 |
| 4,433,537 | 2/1984 | Yokoi | 425/814 |
| 4,494,922 | 1/1985 | Fukuroi et al. | 425/814 |
| 4,599,065 | 7/1986 | Takahashi | 425/DIG. 34 |
| 5,119,534 | 6/1992 | Fujisaki et al. | 29/410 |
| 5,164,205 | 11/1992 | Aimono | 425/336 |

*Primary Examiner*—Jan H. Silbaugh
*Assistant Examiner*—Mark Eashoo
*Attorney, Agent, or Firm*—Hill, Steadman & Simpson

[57] ABSTRACT

A synthetic resin monofilament being continuously supplied is intermittently stamped to form head portions as flattened protuberances bulging laterally. Then the stamped monofilament is bent at the head portions to form leg portions and turnover portions bridging the leg portions of adjacent head portions, forming an continuous coupling element row. While the continous coupling element row is conveyed by a conveying section, the head portions are heated and softened by a heating section, and a head-portion shaping tool having arcuate recesses is brought into contact with the individual outwardly curved softened head portions to shape the external shape of each head portion into an arcuate shape.

6 Claims, 5 Drawing Sheets

5,705,114

ELEMENTS HAVING HEAD PORTIONS WITH ARCUATE EXTERNAL SHAPES

BACKGROUND OF THE INVENTION

1. Field of the Invention

This invention relates to a method and apparatus for manufacturing a row of coiled or zigzag-shaped continuous coupling elements for a slide fastener from a synthetic resin monofilament, and more particularly to a method and apparatus for manufacturing a row of coupling elements which enables smooth coupling and separation of opposed fastener stringers of a slide fastener and can secure a required coupling strength.

2. Description of the Related Art

A method for forming a row of coiled or zigzag-shape continuous coupling elements for a slide fastener from a synthetic resin monofilament is known from, for example, U.S. Pat. No. 5,164,205. In the known method, while it is being continuously supplied to a stamping station, a synthetic resin monofilament is successively stamped, at longitudinally spaced positions to be bent, by a stamping roller to form successive head portions and turnover portions of coupling elements, each of which connects leg portions of adjacent head portions, and then the stamped monofilament is wound around a mandrel to form a row of coiled continuous coupling elements into a final shape. In another known method, a synthetic resin monofilament stamped at predetermined distances by the stamping roller as mentioned above is bent in a zigzag shape and, at the same time, the stamped portions are bent into successive head portions, thereby forming a row of zigzag-shaped continuous coupling elements.

The stamping roller is composed of a large-diameter annular outer roller having desired shaped stamping projections on its inside circumferential surface, and a small-diameter cylindrical inner roller having in its outside circumferential surface recesses for receiving part of the stamping projections, or alternatively, the outside circumferential surface is flat. As the outer and inner rollers are rotated in the same direction partly contacting each other, the monofilament is supplied to a stamping station at which the inside circumferential surface of the annular outer roller and the outside circumferential surface of the cylindrical inner roller strike each other to stamp the monofilament at longitudinally spaced positions intermittently in response to the rotation of the two rollers.

However, according to the method disclosed in U.S. Pat. No. 5,164,205, since the head portions are formed by means of stamping the monofilament by the stamping roller, each of the head portions is flattened and bulge laterally and hence tends to curve upwardly when the stamped monofilament is bent into a coiled or zigzag shape. This upward curving not only deteriorates the coupling strength of the coupling elements but also increases the frictional resistance of a slider during sliding, which would be detrimental to smooth closing and opening operation of a slide fastener.

SUMMARY OF THE INVENTION

With the foregoing problems in view, it is an object of this invention to provide a method and apparatus for manufacturing a row of continuous coupling elements of synthetic resin which enable smooth coupling and separation of opposed fastener stringers of a slide fastener, secure a required coupling strength, and decrease the frictional resistance of a slider during sliding.

According to a first aspect of the invention, there is provided a method for manufacturing a row of continuous coupling elements for a slide fastener comprising the following steps. Firstly, a synthetic resin monofilament, which is continuously supplied to a stamping station, is intermittently stamped at predetermined spaced positions to form successive head portions of coupling elements flattened and bulging laterally. Then, the monofilament at the successive head portions is bent to form a pair of leg portions contiguous to each of the head portions and turnover portions each extending between one leg portion of each of the head portions and one leg portion of the next one of the head portions, thereby forming a series of continuous coupling elements. Thereafter, the successive head portions of the formed coupling elements are heated to soften the head portions. Subsequently, the softened head portions are contacted to a head-shaping tool in such a manner that each of the head portions is finished to have an arcuate external shape.

According to a second aspect of the invention, there is provided an apparatus for manufacturing a row of continuous coupling elements for a slide fastener comprising monofilament supplying means, stamping means, bending means, conveying means, heating means, and a head-shaping tool. The supplying means supplies a synthetic resin monofilament to a stamping station. The stamping means stamps the supplied monofilament intermittently at predetermined spaced positions to form successive head portions flattened and bulging laterally. The bending means bends the monofilament at the successive head portions to form a pair of leg portions contiguous to each of the head portions and turnover portions each extending between one leg portion of each of the head portions and one leg portion of the next head portion, thereby forming a series of continuous coupling elements. The conveying means conveys the coupling elements continuously. The heating means heats the successive head portions of the formed coupling elements to soften the head portions being conveyed by the conveying means. The head-shaping tool having at least one arcuate recess contacts with the softened head portions in such a manner that each of the head portions is finished to have an arcuate external shape.

For production, the monofilament being continuously supplied to the stamping station is stamped by the stamping means to form successive unfinished head portions flattened to have protuberances laterally bulging, and the stamped monofilament is then bent at the head portions successively to form a row of continuous coupling elements.

Generally, when the individual head portion is bent, the protuberances are curved outwardly to lower the coupling strength of the coupling elements so that not only does the slide fastener tend to be accidentally separated, but also the ends of the protuberances come into frictional contact with the coupling-element passage in a slider to increase the frictional resistance during sliding, thus obstructing smooth closing and opening of the slide fastener. In order to overcome this conventional problem, the coupling-element passage in the slider requires more room for coupling elements, which however necessarily impairs the original coupling function of the slide fastener.

To this end, in this invention, the coupling element row formed by bending the head portions is fed to the conveying station. During the conveying, the head portions are softened by heating by the heating means, whereupon the head-shaping tool having an arcuately concave contact surface is brought in contact with the external surfaces of the head portions successively to press the head portions that have become deformable as heated, thereby shaping the entire external surface of the individual head portion, together with the protuberance bulging laterally, arcuately by the contact surface. Subsequently, if it is cooled down suddenly thereafter, the arcuate shape of the head portions will deform due to the shrinkage of the coupling elements. Therefore, in this invention, the coiled coupling element rows are gradually cooled by blowing normal-temperature air by means of the cooling air nozzle. The cooled coiled element row is separated from the conveying section and is then moved to the next station.

Since the individual head portion thus formed has an arcuate shape, when opposite coupling element rows go through a Y-shaped passage formed in a slider body to be coupled and uncoupled, the mating head portions can be smoothly coupled and uncoupled as they slide on each other's arcuate surfaces. Further, since the inside surface of the protuberance is inwardly curved during the shaping of the head portions, a predetermined coupling strength can be achieved.

DETAILED DESCRIPTION OF THE PREFERRED EMBODIMENTS

Figure 1:
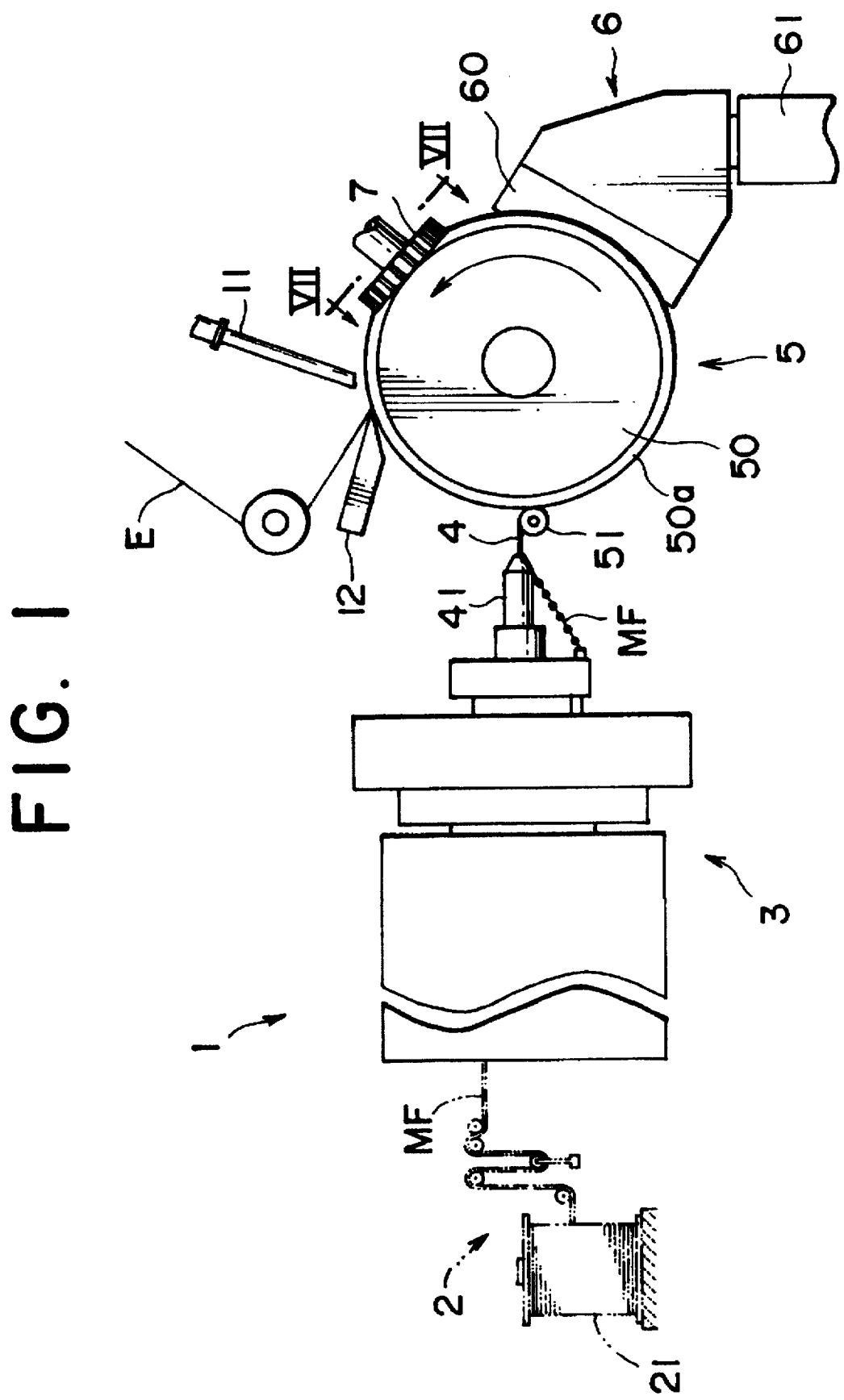
FIG. 1 is a side view schematically showing a typical embodiment of an apparatus for manufacturing a continuous coupling element row, for slide fasteners, according to this invention.
Figure 2:
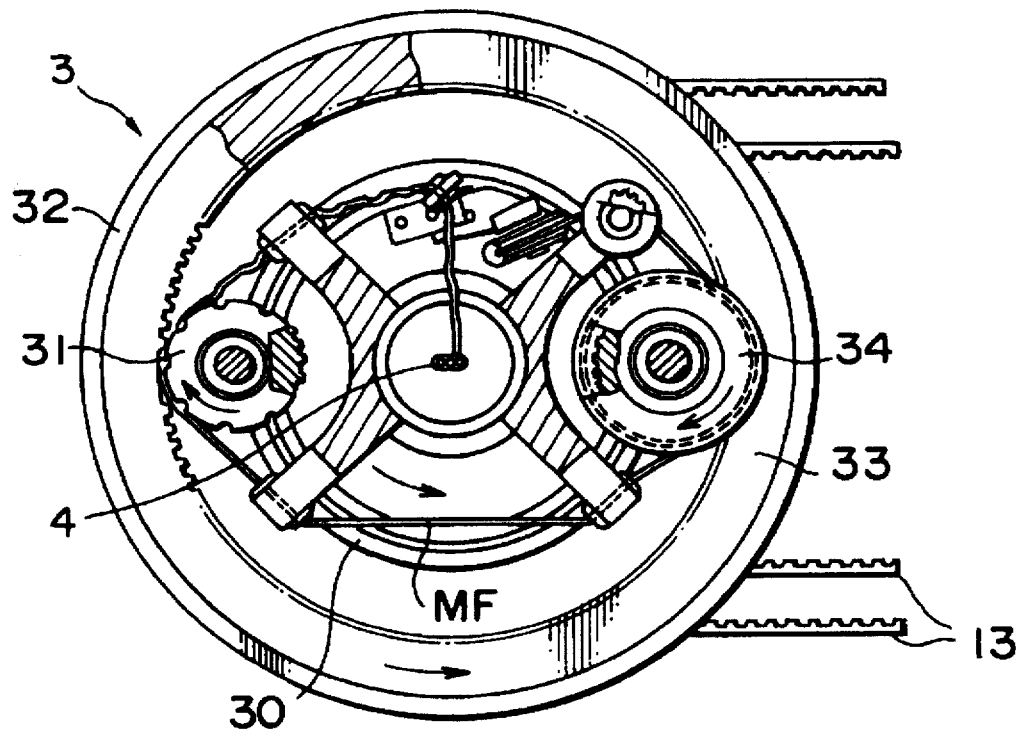
FIG. 2 is a plan view of a stamping and shaping section of the apparatus.

Preferred embodiments of this invention will now be described in detail with reference to the accompanying drawings. FIGS. 1 and 2 show a typical coiled coupling element manufacturing apparatus 1 according to this invention. The apparatus 1 comprises a monofilament supplying section 2 for continuously supplying a synthetic resin monofilament MF from which coupling element row E for a slide fastener is to be formed, a pair of stamping and shaping section 3 for forming head portions, leg-bridging turnover portions and sewing-thread catching grooves on the monofilament MF, a stationary mandrel 4 around. which the stamped monofilament MF is wound into a coiled coupling element row E, a coupling-element-row conveying section 5 for conveying the coiled coupling element row E, a head-portion heating section 6 for heating and softening each of the head portions of the continuous coupling element row E being conveyed by the conveying section 5, and a head-shaping tool 7 for shaping the external shape of the softened head portions.

The stamping section 3 is exemplified by a stamping unit disclosed in U.S. Pat. No. 5,164,205, which is applied in this embodiment. The stamping section 3 is composed of a cylindrical inner roller 31 mounted in an inner rotary cylindrical member 30 and an annular outer roller 33 integrally situated in an outer rotary cylindrical member 32, as shown in FIG. 2.

The inner rotary cylindrical member 30 is rotatably supported centrally in the stamping section 3 via a bearing. The inner rotary cylindrical member 30 is rotated for controlled rotation by a timing belt 13 driven by a non-illustrated drive unit via a non-illustrated gear at the lower end of the inner rotary cylindrical member 30. A non-illustrated support arm is attached to the top of the inner rotary cylindrical member 30, and a monofilament supplying roller 34 and the cylindrical inner roller 31 for stamping the monofilament MF are rotatably supported on the lower surface of the support arm in a symmetrical relationship via the inner rotary cylindrical member 30.

As shown in FIG. 2, part of the outside circumferential surface of the cylindrical inner roller 31 comes into contact with the inside circumferential surface of the annular outer roller 33 to stamp the monofilament MF therebetween. The outside circumferential surface of the cylindrical inner roller 31 has a predetermined number of recesses circumferentially spaced at predetermined distances. The outer rotary cylindrical member 32 is situated outside the inner rotary cylindrical member 30 and is rotatably connected to the lower portion of the inner rotary cylindrical member 30 via a bearing. Inside the upper surface of the outer rotary cylindrical member 32, the annular outer roller 33 is integrally situated. The inside circumferential surface of the annular outer roller 33 has a predetermined number of stamping projections circumferentially spaced at predetermined distances. The stamping projections of the annular outer roller 33 coact with the corresponding recesses of the cylindrical inner roller 31 to perform stamping and shaping.

The shapes of the stamping projections and the corresponding recesses are determined according to the shapes into which the monofilament MF is to be stamped. The head portions may be formed on the monofilament MF by stamping the monofilament MF between the cylindrical inner roller 31, which has the stamping projections on its outside circumferential surface, and the annular outer roller 33, whose inside circumferential surface is flat. Alternatively, the annular outer roller 33 may have on its inside circumferential surface the stamping projections, and the cylindrical inner roller 31 has a flat outside circumferential surface. The outside circumferential surface of the cylindrical inner roller 31 comes partially into contact with the inside circumferential surface of the annular outer roller 33 to stamp the monofilament MF supplied by a predetermined length from the monofilament supply section 2. The annular outer roller 33 has an inner gear which meshes a gear situated under the cylindrical inner roller 31. The cylindrical inner roller 31, which is to be rotated by the outer rotary cylindrical member 32 rotating at a speed lower than the speed of the inner rotary cylindrical member 30, and which rotates on its own axis revolving about the axis of the outer rotary cylindrical member 32. The monofilament MF is continuously supplied to the contact position at which the cylindrical inner roller 31 and the annular outer roller 33 come into contact with each other to stamp the monofilament MF between the outside circumferential surface of the cylindrical inner roller 31 and the inside circumferential surface of the annular outer roller 33.

While the inner rotary cylindrical member 30 makes a single rotation, a monofilament supply roller 34 and the cylindrical inner roller 31 rotate about their respective axes. During that time, the monofilament MF is supplied by a length equal to the distance between adjacent head portions of coupling elements, i.e. the length of a single coupling element, in a predetermined direction, which is stamped and is shaped as it is wound a single turn around the mandrel 4.

Figure 3:
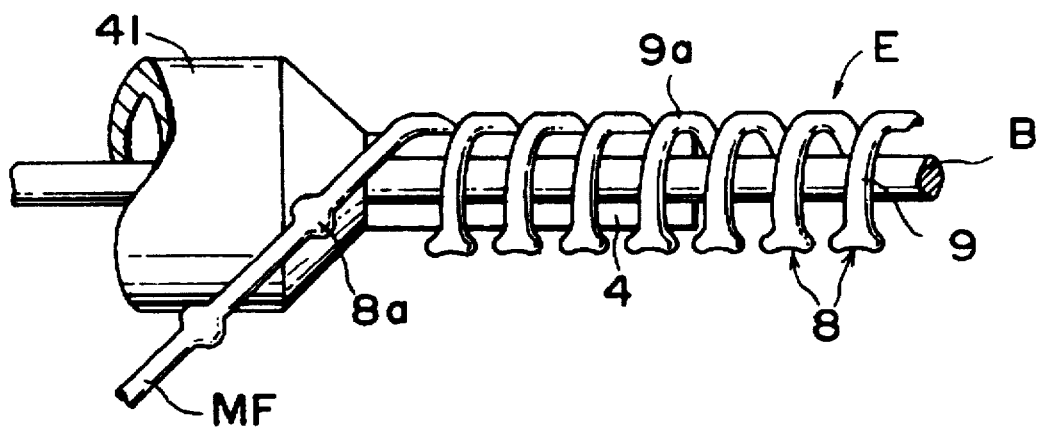
FIG. 3 is a fragmentary side view showing the manner in which a coiled coupling element row is formed by the apparatus.

The base of the mandrel 4 is supported on the top of a mandrel holder 41 which is secured to one end of a non-illustrated stationary shaft supported centrally in the inner rotary cylindrical member 30 via a bearing. The inner rotary cylindrical member 30 rotates about the stationary shaft so that the stamped monofilament MF advances longitudinally of the mandrel 4 while it is bent and wound around the mandrel 4, thereby forming a coiled coupling element row E as shown in FIG. 3. The mandrel 4 has in it a guide passageway through which a core cord B is to be supplied, via a guide hole extending centrally through the non-illustrated stationary shaft, so that the core cord B is paid out together with the coiled coupling element row E as threaded through the coiled coupling element row E.

The monofilament MF is drawn out from a bobbin 21 of the monofilament supply section 2 as shown in FIG. 1 and is guided upwardly from the lower end of the inner rotary cylindrical member 30 as shown in FIG. 2. Then the monofilament MF is supplied to the contact position between the outside circumferential surface of the cylindrical inner roller 31 and the inside circumferential surface of the annular outer roller 33 via various pulleys attached to the inner rotary cylindrical member 30. While the monofilament MF is supplied under a predetermined tension at a constant speed in synchronism with the rotation of the outer and inner rollers 33, 31, it is stamped successively at positions spaced longitudinally at regular distances.

Figure 4:
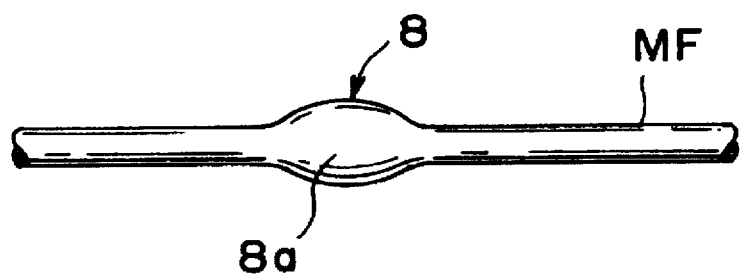
FIG. 4 is a plan view of a monofilament having head portions formed by the stamping and shaping section.
Figure 5:
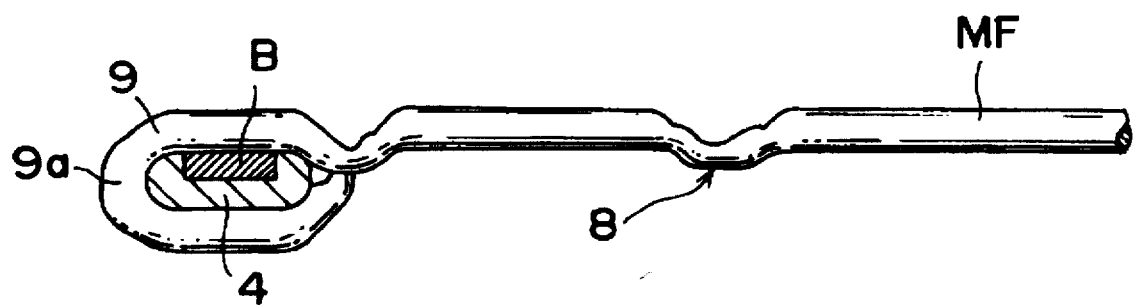
FIG. 5 is a front view showing the manner in which the monofilament is wound around a mandrel.

FIG. 4 shows the monofilament MF obtained by the stamping method of this invention, and FIG. 5 shows the manner in which the stamped monofilament MF is progressively wound around the mandrel 4 to form the individual coupling elements. As shown in FIGS. 4 and 5, the individual head portion 8 has a flattened protuberance 8a bulging laterally, and the monofilament MF is bent at the head portions 8 and is progressively wound in a coil shape around the mandrel 4 while the core cord B is threaded through the coiled monofilament MF, thereby finally forming a coiled coupling element row E.

Generally, when the flattened head portion 8 is bent, the protuberance 8a assumes an outwardly concaved shape as shown in FIG. 3. As the individual protuberance 8a is thus curved, the coupling strength of the coupling elements is lowered so that not only the slide fastener tends to be accidentally separated, but also the ends of protuberances 8a come into frictional contact with the coupling-element passage in a slider to increase the frictional resistance during sliding, thereby obstructing smooth closing and opening of the slide fastener. In order to overcome this conventional problem, the coupling-element passage in the slider requires more room for coupling elements, which however necessarily impairs the original coupling function of the slide fastener.

Figure 6:
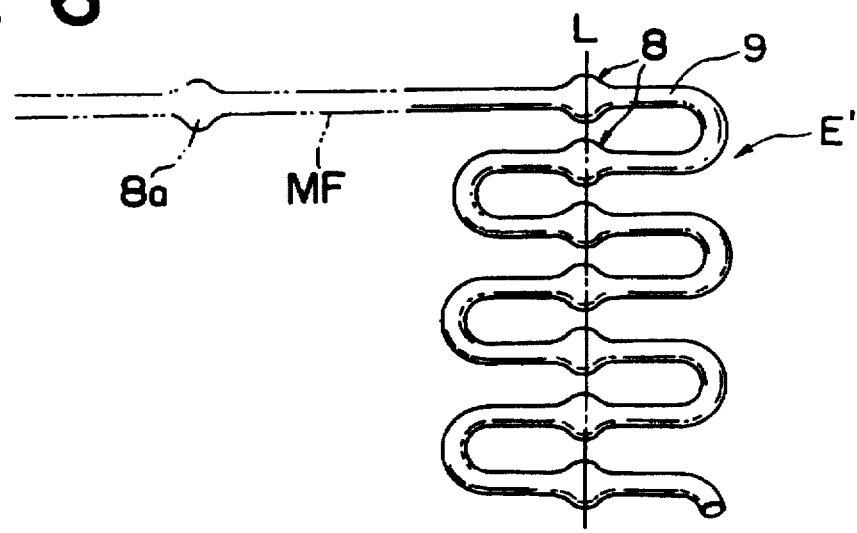
FIG. 6 is an expansion view of a zigzag-shaped coupling element row which is another form of continuous coupling element row.

FIG. 6 is an expanded view of a zigzag-shape coupling element row E' obtained from the monofilament MF on which the head portions 8 are formed as described above. As shown in FIG. 6, with the successive head portions 8 centrally arranged in a straight line, the monofilament MF is bent in a zigzag shape except the leg portions 9. The zigzag-shape monofilament MF is further bent at the successive head portions 8 along a centrally extending straight line L, thus forming continuous coupling element row E'.

Figure 7:
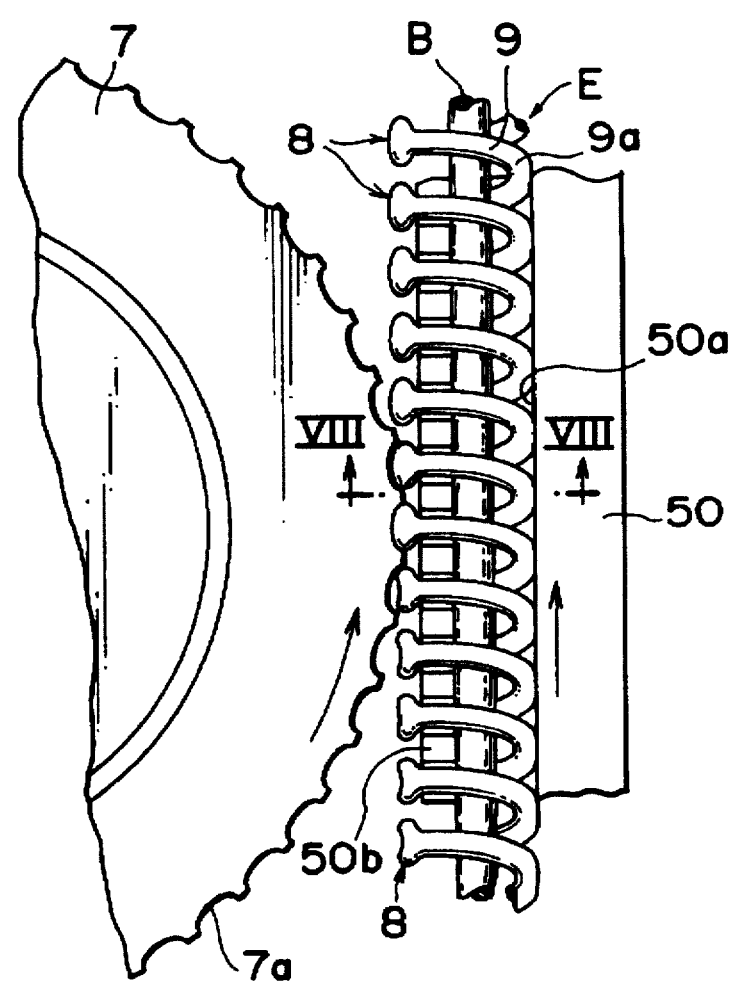
FIG. 7 is an enlarged view taken along line of VII—VII of FIG. 1.
Figure 8:
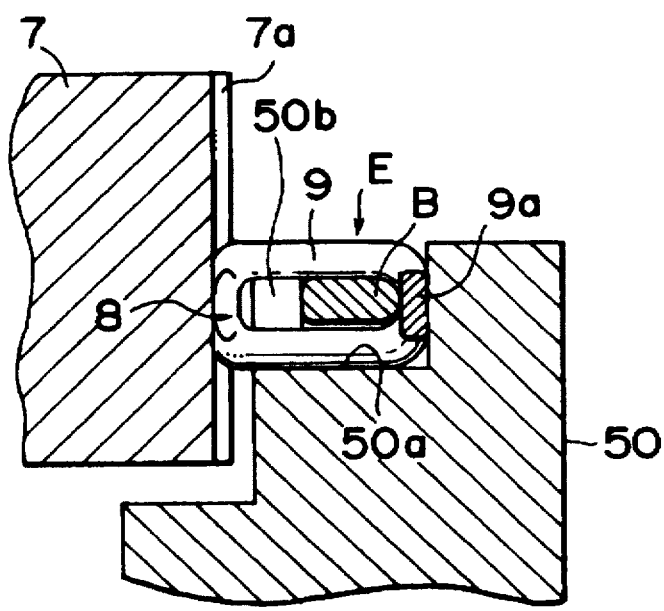
FIG. 8 is a cross-sectional view taken along line VIII—VIII of FIG. 7.

The coiled continuous coupling element row E is then introduced to the next station, i.e. the element-row conveying section 5, as paid out progressively from the mandrel 4. At that time, the continuous coupling element row E paid out from the mandrel 4 assumes a posture in which the head portions 8 are arranged in a common straight line as shown in FIG. 3. In the embodiment of FIG. 1, the element-row conveying section 5 is equipped with a die wheel 50 which is positively rotated about a horizontal axis by a non-illustrated drive unit to convey the continuous coupling element row E via a guide roller 51. Since the continuous coupling element row E with the head portions 8, which are paid out in line from the mandrel 4, are projecting from the side surface of the die wheel 50 while they are conveyed, the outside circumferential surface of the die wheel 50 has an element-row guide channel 50a for contacting and guiding the leg portions 9 and turnover portions 9a of each of the coupling elements and a partition plate 50b adapted to be inserted between the individual coupling elements to feed the individual coupling element in a predetermined pitch, as shown in FIGS. 7 and 8, the guide channel 50a and the partition plate 50b being circumferentially spaced apart. With this arrangement, even though the coupling element row is heated and shaped as described below, it is possible to convey the coupling element row with keeping its predetermined shape and pitch.

In the embodiment of FIG. 1, the region in which the continuous coupling element row E is to be conveyed by the die wheel 50 is a range corresponding to substantially ⅚ of the entire circumference (the central angle is about 300°). In this conveying region, a head-portion heating section 6, a cooling air nozzle 11 and a scraper 12 are successively situated along the conveying path of the continuous coupling element row E.

Of these units situated along the conveying path of the continuous coupling element row E, the head-portion heating section 6 and the head-portion shaping tool 7 constitute the most significant components of this invention. According to the illustrated embodiment, as shown in FIG. 1, the head-portion heating section 6 is composed of a heated air nozzle 60 facing the outside circumferential surface of the die wheel 50 along a predetermined range to be heated, and a heated air supply pipe 61 connected to the heated air nozzle 60 for supplying heated air of a temperature high enough to soften the head portions 8.

The head-portion shaping tool 7 has a disk adapted to be rotated in synchronism with the die wheel 50 and having an outside circumferential surface for pressing the head portions 8, which projects from the side surface of the element-row guide channel 50a situated along the outside circumferential edge of the die wheel 50, by a predetermined pressure. The outside circumferential surface of the disk has a multiplicity of arcuate recesses 7a in and along the entire circumference. The individual arcuate recesses 7a comes into contact with the tops of the successive head portions 8 to be conveyed at a constant pitch in response to the rotation of the die wheel 50 so that the head portions 8 heated so as to deform is stamped, thus shaping the top of the laterally bulging protuberance 8a into an arcuate shape complementary to the recess 7a as shown in FIG. 7. Subsequently, in order to prevent the arcuate shape of the head portion 8 to deform due to the shrinkage of the coupling element by sudden cooling, the coiled coupling element row E are gradually cooled by blowing normal-temperature air from the cooling air nozzle 11 as shown FIG. 1. The cooled coiled element row E is separated from the die wheel 50 by the scraper 12 and is then moved to the next station.

Figure 9:
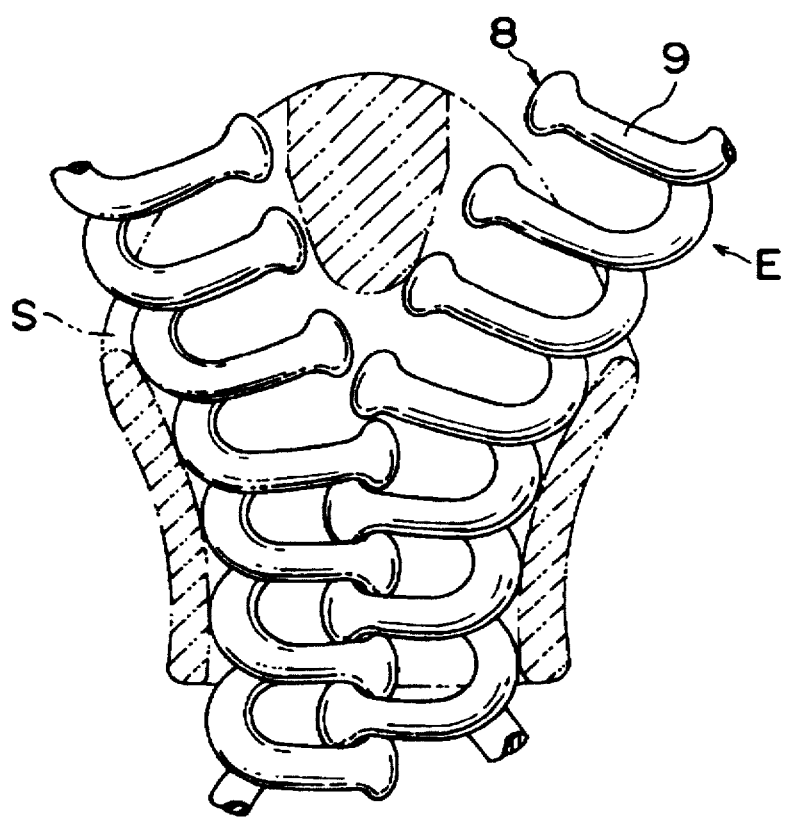
FIG. 9 is an enlarged plan view showing the manner in which the opposed coupling element rows obtained according to this invention are coupled and uncoupled.

FIG. 9 shows the manner in which the opposed coiled coupling element rows E having the arcuately head portions 8 come into engagement with each other. As shown in FIG. 9, since the individual head portion 8 has an arcuate shape, when opposite coupling element rows E go through the Y-shaped coupling element passage formed in a slider body S, the mating head portions can be smoothly coupled and uncoupled as they slide on each other's arcuate surfaces. Further, since the inside surface of the protuberance 8a is inwardly curved during the shaping of the head portions 8, a predetermined coupling strength can be secured.

This invention should by no means be limited to the illustrated embodiments. For example, a zigzag-shaped coupling element row E' shown in FIG. 6 may be substituted for the coiled coupling element row E; since the protuberance 8a is outwardly curved when the head portion is bent, the above-mentioned head-portion shaping method can be applied.

As is apparent from the foregoing description, according to the method of this invention, partly since the successive head portions of the coupling element row are shaped one at a time in an arcuate external shape and partly since the shaped individual head portion has an ideal shape, it is possible to secure an adequate degree of coupling strength and smooth coupling and separation of coupling element rows and to reduce the slider in size. Further, with the apparatus of this invention, it is possible to the above-mentioned shape of head portion by only slightly reconstructing the conventional apparatus, thus resulting in a remarkably improved rate of production.

What is claimed is:

1. A method for manufacturing a row of continuous coupling elements for a slide fastener, comprising the steps of:

(a) intermittently stamping a synthetic resin monofilament, which is continuously supplied to a stamping station, at predetermined spaced positions to form successive head portions flattened and bulging laterally;

(b) bending the monofilament at said successive head portions to form a pair of leg portions contiguous to each of said successive head portions and turnover portions each extending between one leg portion of each of said successive head portions and one leg portion of the next one of said successive head portions, thereby forming a series of continuous and successive coupling elements extending in a longitudinal direction with said successive head portions having a concave arcuate external shape in said longitudinal direction;

(c) heating said successive head portions of the formed coupling elements to soften said head portions; and then (d) contacting the softened successive head portions to a head-shaping tool in such a manner that each of said successive head portions is re-shaped to have a convex arcuate external shape in said longitudinal direction.

2. The method according to claim 1, wherein the step of bending the monofilament is further defined in that said monofilament is wound around a mandrel.

3. The method according to claim 1, wherein said step of heating said successive head portions is further defined in that hot air is directed against said successive head portions.

4. The method according to claim 1, wherein said step of contacting the softened head portions is further defined in that a disk is provided having concave arcuate recesses on its outside circumference and arranged to rotate to continuously contact each of said successive head portions intermittently, and comprising the further step of continuously moving said series of continuous and successive coupling elements past said disk.

5. The method according to claim 4, wherein said step of continuously moving said series of continuous and successive coupling elements is further defined in that a die wheel is provided to continuously move said series of continuous and successive coupling elements along an outside circumference thereof.

6. The method according to claim 5, wherein said step of heating said successive head portions is further defined in that a hot air nozzle is applied closely to an outside circumference of said die wheel to heat the coupling elements passing on an outside circumference of said die wheel.

* * * * *